Figure 1:
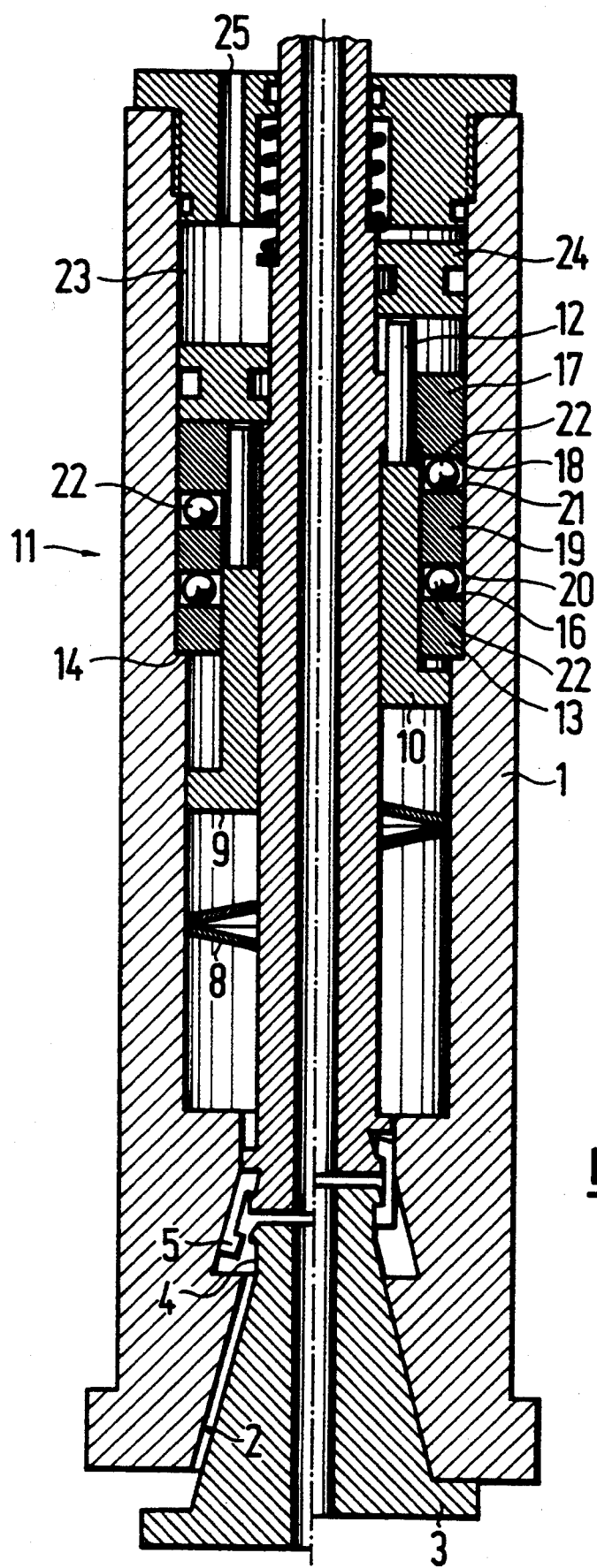

United States Patent [19]

Kelch

[11] Patent Number: 5,425,606
[45] Date of Patent: Jun. 20, 1995

[54] TOOL CLAMPING AND RELEASING DEVICE

[76] Inventor: Wolfgang Kelch, Mozartweg 12, D-73614, Schorndorf, Germany

[21] Appl. No.: 214,638

[22] Filed: Mar. 18, 1994

[30] Foreign Application Priority Data

Mar. 19, 1993 [DE] Germany .................. 43 08 736.1

[51] Int. Cl.⁶ ............................................. B23C 5/26
[52] U.S. Cl. ..................................... 409/233; 409/231
[58] Field of Search ............................... 409/231, 233

[56] References Cited

U.S. PATENT DOCUMENTS 5,018,916 5/1991 Bauch et al. .................. 409/233
5,052,866 10/1991 Bauch et al. .................. 409/233

FOREIGN PATENT DOCUMENTS 39 36 122.5 10/1990 Germany .

*Primary Examiner*—Daniel W. Howell
*Attorney, Agent, or Firm*—Gary M. Nath; John F. McGowan; Nath, Amberly & Associates

[57] ABSTRACT

A tool clamping and releasing device comprises an axially movable tie rod and a shifting apparatus for the tie rod actuated by cup springs. The shifting apparatus comprises a sliding collar subject at one end to the action of the cup springs and which is provided with cams on the opposite end. A rotary collar has pins engaging the cams so that axial movement of the sliding collar rotates the rotary collar, which has a ramp; the tie rod has a cooperating ramp, so that axial movement of the sliding collar causes rotation of the rotary collar and axial movement of the tie rod.

22 Claims, 3 Drawing Sheets

TOOL CLAMPING AND RELEASING DEVICE

The invention relates to a clamping and releasing device for tools, in which an actuating means, e.g. a cup spring set, engages on a tie rod for the displacement thereof. In turn, with the aid of holding clamps, collets or similar devices, the tie rod engages on the tool. During the displacement of the tie rod, a taper of the tool or a tool holder is fixed in a taper receptacle.

An actuating device for a tool clamping device is already known, in which a wedge gear engaging between the spindle and the tie rod is provided and has freely movable balls. The latter are supported on three taper faces, whereof the first is located on an axially displaceable clamp collar, the second on a clamping ring connected to the tie rod and the third on a stationary abutment ring (German patent 39 36 122).

The problem of the invention is to provide a clamping and releasing device for tools or work pieces, which permits high clamping forces.

As a result of the rotary arrangement around the tie rod, not only is a space-saving arrangement provided, but there is also a possibility for a space-saving drive.

According to a further development, the rotary gear element has a ramp, which cooperates with an opposite ramp connected in non-rotary manner to the tie rod for the displacement of the latter. On rotating the rotatable gear element there is consequently a cooperation between the two ramps in such a way that the tie rod is axially displaced. In particular, the opposite ramp can be constructed on a ring element, which is at least supported or connected axially to the tie rod.

The connection between the tie rod and the ring element e.g. takes place with advantage by means of a screw connection, an external thread being provided on the tie rod and an internal thread on the ring element. As a result, in the assembled state, it is possible to adjust the spacing of the ring element with respect to the rotary gear element.

According to the invention, the rotary gear element has a ramp, which cooperates with an opposite ramp connected in non-rotary manner to a spindle casing. As a result, when the rotary gear element is rotated there is simultaneously an axial movement of the gear element, which can also be utilized for moving the tie rod. It is naturally particularly advantageous if the gear element has such ramps in both axial directions, because then the two axial movements are summated. In particular, the opposite ramp can be constructed on a ring element, which is axially supported on the spindle casing.

According to a further development of the invention, in order to reduce friction a rolling element is interposed between the ramp and the opposite ramp. It can e.g. be a ball, a rolling member, etc. According to the invention, in the case of the gear element, the ramp can be present a number of times distributed over the circumference, so that there are then several rolling members.

According to the invention, the device can have a sliding collar subject to the action of the actuating means, e.g. a cup spring set and which during its displacement rotates the rotary gear element.

According to a further development of the invention at least one of the two ring elements is guided in non-rotary manner on the sliding collar. Preferably both ring elements are guided in non-rotary manner on the sliding collar.

The invention proposes that the sliding collar has axial extensions, which pass through openings in the ring element associated with the tie rod. These extensions inter alia serve to maintain the ring element in non-rotary manner with respect to the sliding collar. Thus, a readjustment of the actuation by rotating the ring element can only take place if the sliding collar with its extensions is moved back sufficiently far to enable the rotation to take place.

According to a further development of the invention, the sliding collar has a cam face, on which engages a cam positioned on the rotary gear part. On displacing the sliding collar the cam then slides on said cam face, which leads to a rotation of the rotary gear part. The cam face can be formed on an end face of a recess or a slit. There can also be two or more such cam faces distributed over the circumference in order to keep the loading low, even at high speeds.

According to the invention, the cam face can be shaped in such a way that a force and path characteristic appropriate for the drawing in or retraction movement can be obtained. In particular, the cam face can be shaped in such a way that at the start of the drawing in movement, when no high clamping forces are necessary, a large stroke can be produced with limited force, whereas towards the end of the clamping movement the stroke becomes constantly smaller and the force constantly greater.

According to the invention the device has a pressure device acting in the opposite direction of the actuating means for the reciprocal actuation of the ring elements. With the aid of said pressure device it can be ensured that on releasing the clamping device the gear parts remain in reciprocal engagement and the gear can be returned to its starting position with the minimum axial extension. The pressure device can e.g. have a compression spring, which acts on the tie rod.

It is also possible and is proposed by the invention that the pressure device has a differential piston on the tie rod, i.e. a portion, where the tie rod has a reduced diameter, so that the shoulder formed in the transition can act as a piston.

According to a further development of the invention the sliding collar concentrically embraces the gear parts, which is advantageous for high forces and force transmissions.

According to the invention, the gradient or slope of in each case two cooperating ramps is identical. This ensures that at this point there is no rolling friction between the gear parts and the rolling members.

According to the invention, the gradient of the ramps associated with the spindle casing can be somewhat greater than the gradient of the ramps associated with the tie rod. This leads to a more uniform loading of the rotary gear part acting as a gear wedge.

It is also possible and is proposed by the invention to shape the ramps in such a way that at the start of the drawing in movement a high transmission is possible, whereas towards the end of said movement, when it is a question of clamping with high force, there is only a small drawing in movement, but a higher force. In this case, the developed curved shape of the ramps diverges from a straight line.

The cooperating ramps can have reception notches for the rolling members, so as to form a large path transmission at the start of the clamping stroke.

Further features, details and advantages of the invention can be gathered from the claims and the following description of a preferred embodiment of the invention and with reference to the attached drawings, wherein show:

FIG. 1 A longitudinal section through a spindle casing with a clamping device according to the invention.

Figure 2:
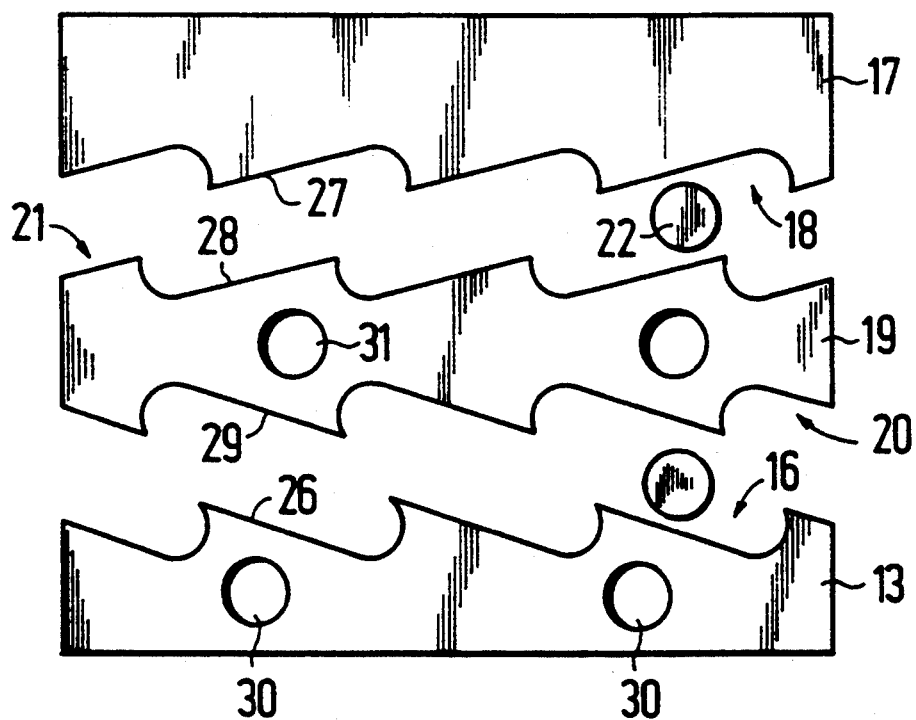

FIG. 2 A developed view of three cooperating shifting apparatus parts.

Figure 3:
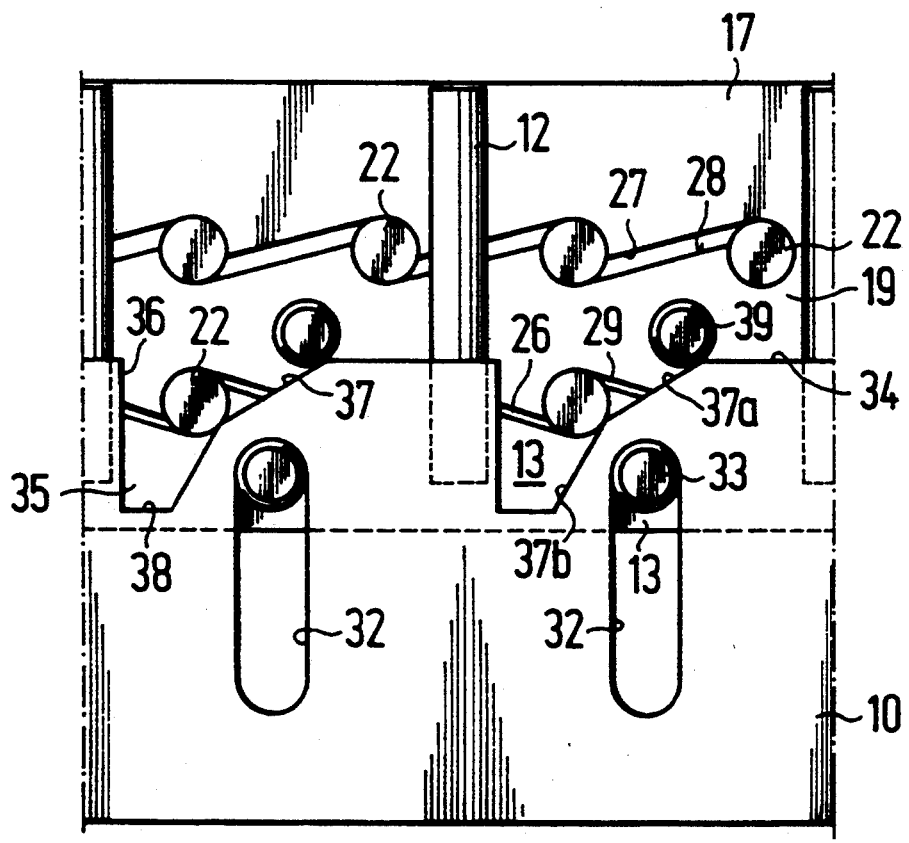

FIG. 3 A developed shifting apparatus gear in a state in which the tool is not retracted, corresponding therefore to the left-hand half of FIG. 1.

Figure 4:
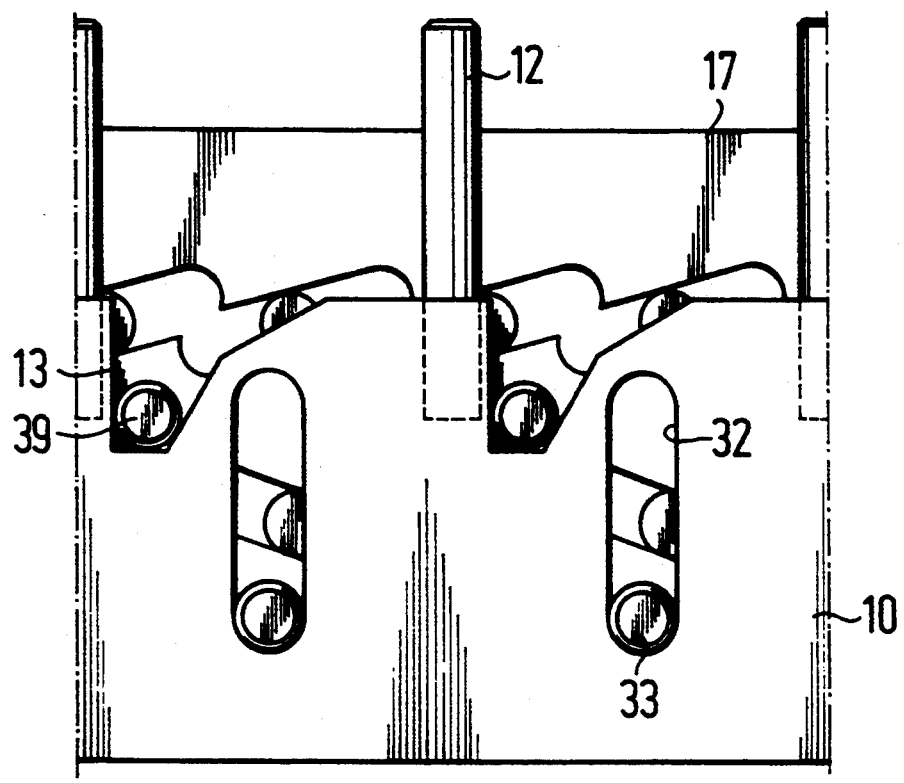

FIG. 4 A representation of the shifting apparatus in the clamped state corresponding to FIG. 3 and as corresponds to the right-hand half of FIG. 1.

Figure 5:
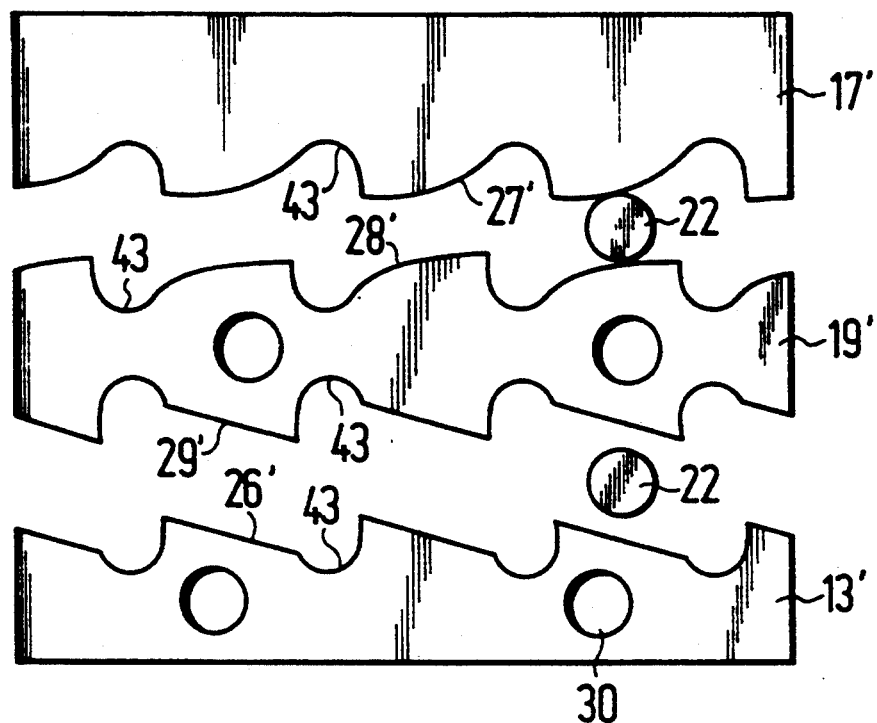

FIG. 5 A representation corresponding to FIG. 2 in the case of a modified embodiment.

FIG. 1 shows a spindle casing 1 in the form of an elongated, hollow cylinder. On the lower end of the spindle casing 1 in FIG. 1 is formed a conical face 2 against which is braced the outside of a tool shank 3. At its end located in the spindle casing 1 the tool shank 3 has a recess 4 on whose edge engages the collets 5. The collets 5 are mounted in the end region of a tie rod 7. An annular space for housing cup springs 8 is provided around the tie rod 7. The cup spring act as actuating means on an end face 9 of a sliding collar 10 and move the latter upwards in FIG. 1, i.e. away from the tool shank 3. The sliding collar 10 is part of shifting apparatus 11 used for moving the tie rod. The shifting apparatus 11 acts between the actuating means, namely the cup springs, and the tie rod 7.

Extending from the end opposite the end face 9, the sliding collar 10 is provided with individual extension pins 12, which pass through recesses in a transverse enlargement of the tie rod 7. The extension pins 12 are firmly connected to the sliding collar 10, e.g. being fitted into holes or welded to the collar 10.

With the spindle casing 1 is associated a ring element 13, which rests on a shoulder 14 of casing. The cylindrical part 15 of the sliding collar 10 passes through the inner opening of the ring element 13. The surface 16 remote from the shoulder 14 is constructed in ramp-like manner. Therefore the height of each portion of the ring element 13 is dependent on the circumferential position of that portion.

Axially beyond the ring element 13 and remote from the cup spring set 8 is a second ring element 17, connected to said tie rod 7, The ring element 17 has a surface 18 facing the first-mentioned ring element 13 and also has a ramp-like construction.

The ring element 17 tie rod 7 is screwed to said tie rod 7. For this purpose the tie rod has a portion with an external thread, into which is screwed the ring element 17 having an internal thread. Therefore the two threads are coaxial to the tie rod 7. In FIG. 1 the said thread is concealed by the pin-like extensions 12, which engage through longitudinal openings, which are partly formed in the tie rod 7 and partly in the ring element 17. When the pins 12 are with drawn, the thread permits a setting of the pretension, and when inserted, the extension pins 12 ensure that no rotation takes place and consequently fix the ring element 17 against rotation both with respect to the tie rod 7 and with respect to the sliding collar 10.

A rotatable collar 19 is located between the two ring elements 13 and 17 it is fixed neither axially nor in the rotation direction. It has a first surface 20 facing the ring element 13 and has a ramp-like construction. The facing surface 21, which faces the ring element 17 connected to the tie rod 7, also has a ramp-like construction. Between the two facing, ramp-like end surfaces 18 and 21 or 20 and 16 are inserted rolling members 22. The latter can e.g. be balls and are shown as such in the drawing for reasons of simplicity.

In FIG. 1 above the ring element 17 connected to the tie rod is formed an annular pressure space or chamber 23 around said tie rod and in which is axially displaceably arranged an annular piston 24. Connected to the pressure chamber 23 there is a passage 25 for a pressure medium used for the displacement of the piston 24.

The upper portion of the tie rod 7 located in the annular pressure chamber 23 has a reduced diameter. On said reduced diameter portion is located a ring 41, which is screw threaded into the end of the spindle casing 1. The step formed in the transition between the two different diameters forms a differential piston face, which causes downward movement actuation of the tie rod 7 independently of the annular piston 24. This action can be supplemented by the compression spring 42 acting on the ring 41 and which acts in the opposite direction to the cup springs 8. Thus, as result of the screw connection between the tie rod 7 and the ring element 17, there is an urging of the towards one another, so that the rolling members 22 remains held between the corresponding ramp surfaces 16 and 18 and the shifting apparatus 11 is moved back into its starting position.

In order to release the tool shank 3 from the spindle device, pressure medium is introduced into the pressure chamber 23 through passage 25 and as a result of the pressure displaces the piston 24 towards the lower spindle end in FIG. 1. By means of the pins 12 the piston 24 acts on the sliding collar 10 and moves the latter against the action of the cup springs 8, which are tensioned. As soon as the piston 24 engages on the top side of the ring element 17 in FIG. 1, it moves the tie rod 7 downwards counter to the further action of the cup spring, so that its lower end ejects the tool shank 3. The tie rod 7 assumes the end position shown in the lefthand half of FIG. 1. In order to again clamp a tool, the pressure in the pressure chamber 23 is reduced by means of the passage 25. The cup springs move the sliding collar upwards in FIG. 1, rotating the rotary collar part 19 in a manner which is as yet to be described. As a result of the ramp shape of surface 21 this leads to an increase in the spacing between the ring element 13 associated with the spindle casing 1 and the ring element 17 associated with the tie rod 7 and consequently to an upward displacement of said tie rod. Simultaneously, by means of the pins 12, the sliding collar 10 slides the piston 24 back into the starting position shown to the right in FIG. 1.

FIG. 2 shows in a developed view three parts of the shifting apparatus 11 used in FIG. 1. These consist of the ring element 13 associated with the spindle casing 1, the ring element 17 connected to the tie rod 7 and the collar 19 positioned between them. The developed view shows a complete circumference. The surface 16 which is at the top in FIG. 2, i.e. remote from the cup springs, has the form of four ramps 26.

The surface 18 of the ring element 17 associated with the tie rod 7 and facing the cup springs also has the form of four ramps. The two ramps are oriented in opposition to one another. The transition between two adjacent ramps 27 or 26 is in the form of a circular arc line corresponding to the shape of the rolling members 22.

Between the two ring elements 13, 17 is positioned the collar 19, whose two end surfaces 20, 21 have the form of ramps 28, 29, so that the collar 19 is wedge-shaped in adjacent zones. On assuming that the three parts of FIG. 2 are arranged in such a way that the ramps are in contact, a rotation of the central collar 19, which would represent a displacement in FIG. 2 in the leftward direction, would lead to a spreading apart of the two ring elements 13, 17. If rolling members 22 are placed between the facing ramps 26, 29 or 27, 28, then on rotating collar element 19 the same action occurs. As the facing ramps 26, 29 and 27, 28 have the same gradient, there is a rolling of the rolling members 22.

The ring element 13 associated with the spindle casing 1 has two radially directed openings 30, in which can be inserted radially directed studs. These studs are used for fixing and guiding the ring element 13 on the sliding collar 10, as will be shown hereinafter.

The rotary gear element 19 also has holes 31 for the insertion of studs. However, these studs are not used for fixing the gear element 19 and instead act in its inwardly projecting part as cams with the aid of which collar element 19 can be rotated. This will now be explained relative to FIG. 3, which is a developed view of the shifting apparatus 11 when the clamping device is in the released state and which corresponds to the lefthand half of FIG. 1. The sliding collar 10 has axially extending elongated holes 32, whose width corresponds to the diameter of a stud 33, which is inserted in the opening 30 of the ring element 13. The length of the elongated holes 32 corresponds to the possible sliding path of the sliding collar 10.

The end surface 34 of collar 10 remote from the end face 9 thereof on which engage the cup springs, is provided with two identical recesses 35. A boundary flank 36 of the recesses 35 runs longitudinally, whereas the other boundary flank is inclined forming a cam face 37. The boundary flank 36 could also be parallel to the cam face 37. The cam face 37 contains a first portion 37a emanating from the end surface 34 which is at right angles to the longitudinal axis, and has a relatively small gradient, and a second portion 37b, connected thereto and having a larger gradient. The recesses 35 are terminated by a portion 38 running in the circumferential direction.

Between the ramps 26, 29 and the ramps 27, 28 are inserted individual rolling members 22. The central, rotary collar 19 is located in a position in which there can be no further movement to the right in FIG. 3, because the rolling members 22 are at the lowest points of the ramps. Further studs 39 are inserted in the holes 31. The studs 39 project inwards, so that they engage with the cam faces 37.

If the pressure in the pressure chamber 23 is now reduced, then the cup springs 8, which engage on the end face 9 of the sliding collar 10, force the latter linearly upwards. The studs 39 slide or, if they are provided with rolls, roll on the first portion 37a of the cam face 37, so that the rotary collar 19 is forced to move to the left in FIG. 3. As at the beginning of the clamping movement there is no need to apply large force, since said first portion 37a of the cam face 37 has a relatively small inclination. This means that only a small upward movement of the sliding collar 10 leads to a large rotary movement of the collar 19. As a result of the wedge shape of the ramps 28, 29, the collar 19 is not only moved to the left, but is also displaced upwards. The upward displacement of the collar 19 leads to an increased upward movement of the ring element 17 and therefore the tie rod 7. As soon as, during the upward movement of the sliding collar 10, the studs 39 pass the juncture connecting the two portions 37a, 37b of the cam face 37, there is a further rotation of the gear part 19 and therefore a rising of the ring element 17 with a much smaller feed speed, but with a higher force.

At the end of the upward movement of the sliding collar 10, the parts have the configuration shown in FIG. 4, the studs 33 now being located on the opposite ends of the elongated holes 32. Simultaneously the studs 39 engage on the bottom 38 of the recesses 35.

The invention provides a shifting apparatus with two stages making it possible to have the drawing in movement such that the high clamping force only occurs at the end of the drawing in movement, i.e. when it is needed.

In the case of the embodiment shown in FIG. 5, there are once again three collar, namely the two ring elements 13' and 17', as well as the rotary gear part 19' shown in the same position as in FIG. 2. The ramps 26' present on the ring element 13' associated with the spindle casing 1 and the facing ramps 29' are constructed linearly and with the same angle in the developed view and at the in each case lowest point of the ramps axially extending depressions 43 are formed. These depressions or notches 43 serve to bring about a large path transmission at the start of the drawing in movement.

There are also such notches for the rolling members 22 in the case of the ramps 27', 28' between the rotary collar 19' and the ring element 17' associated with the tie rod 7. The path of the two ramps 27', 28' is curved and not linear. As a result the clamping movement is such that at the start thereof a large path transmission is obtained, which then gradually changes to a smaller feed with a larger force.

The example of FIG. 5 shows that as a result of possible curved shapes in the case of the cam faces of the sliding collar and the two pairs of ramps, there is a large selection possibility enabling the drawing in characteristic of the clamping device to be adapted to the particular requirements.

We claim:

1. Clamping and release device for tools and/or work pieces having a tie rod for direct or indirect engagement on the tool or work piece, an actuating means for displacing the tie rod and a gear which is placed between the actuating means and the tie rod, moves the tie rod out of its release position into a clamping position and has at least one movable gear element (19), which is positioned concentrically to the tie rod and is constructed so as to rotate about the axis of the tie rod for axially engaging thereon.

2. A tool clamping and releasing device comprising:
   (a) a linearly extending tie rod having means on one end thereof for releasably engaging a tool or workpiece;
   (b) apparatus for shifting said tie rod between a release position and a tool clamping position comprising:
      (i) a rotatable collar concentric with said tie rod; and
      (ii) means responsive to rotational movement of said collar for axially moving said tie rod; and
   (c) actuating means for rotating said collar.

3. The device according to claim 2, wherein said means for axially moving said tie rod comprises a ramp on said collar and a cooperating ramp carried by said tie rod.

4. The device according to claim 3, wherein there is at least one rolling member between said ramps.

5. The device according to claim 4, wherein said ramps have axially extending notches for receiving rolling members.

6. The device according to claim 3, wherein a ring element is connected to said tie rod, said ring element having said cooperating ramp thereon.

7. The device according to claim 6, wherein said ring element is connected to said tie rod by screw threads.

8. The device according to claim 7, wherein the gradient of the ramp of the spindle casing are somewhat larger than the gradient of the ramp carried by said tie rod.

9. The device according to claim 3, wherein the gradient of the cooperating ramps is identical.

10. The device according to claim 3, wherein said ramps are curved.

11. The device according to claim 3, said actuating means comprising a spring exerting a force in a first axial direction, said device further comprising means for exerting a force on said shifting apparatus in the opposite direction to said spring to move said tie rod in the direction opposite to the movement thereof by said means responsive to rotational movement of said collar.

12. The device according to claim 11, wherein said means for exerting a force on said shifting apparatus comprises a spring.

13. The device according to claim 12, wherein said means for exerting a force on said shifting apparatus comprises a piston, said piston being on said tie rod.

14. The device according to claim 3, and further comprising a spindle casing in spaced concentric relationship with and outwardly of said tie rod, said spindle casing having a ramp, and said collar having a ramp in cooperative relationship with said ramp on said casing for causing movement of said collar axially away from said ramp on said spindle casing upon rotation of said collar.

15. The device according to claim 14, and further comprising a ring element concentrically in said spindle casing and supported thereon, said ramp of said spindle casing being on said ring element.

16. The device according to claim 15, wherein there is at least one rolling member between said ramp on said casing and said ramp of said collar in cooperative relation therewith.

17. The device according to claim 2, wherein said actuating means comprises a second collar, said second collar being axially movable, and means on said collars for causing rotation of said rotatable collar upon axial movement of said second collar.

18. The device according to claim 17, wherein said means for axially moving said tie rod comprises a ramp on said rotatable collar, a ring element secured to said tie rod having a ramp in cooperative relation with said ramp on said rotatable collar, and further comprising means on said ring element and said second collar for guiding said second collar for nonrotational movement.

19. The device according to claim 18, wherein said means for guiding said second collar comprises an axially extending pin on said second collar, said ring element having an axially extending opening therethrough, and said pin extending in said opening.

20. The device according to claim 17, said second collar having a cam face and said first mentioned collar having a cam follower thereon in engagement with said cam face, said cam face and said cam follower causing rotary movement of said first mentioned collar upon axial movement of said second collar.

21. The device according to claim 20, wherein said cam face of said second collar having a first portion providing a relatively small force to said first collar and a second portion providing a relatively large force to said first mentioned collar.

22. The device according to claim 14, wherein said second collar is concentric outwardly of said first mentioned collar.

* * * * *